US008266524B2

(12) United States Patent
Bailey

(10) Patent No.: US 8,266,524 B2
(45) Date of Patent: Sep. 11, 2012

(54) EDITING A DOCUMENT USING A TRANSITORY EDITING SURFACE

(75) Inventor: Eric Dana Bailey, Issaquah, WA (US)

(73) Assignee: Microsoft Corporation, Redmond, WA (US)

( * ) Notice: Subject to any disclaimer, the term of this patent is extended or adjusted under 35 U.S.C. 154(b) by 1026 days.

(21) Appl. No.: 12/037,059

(22) Filed: Feb. 25, 2008

(65) Prior Publication Data

US 2009/0217158 A1 Aug. 27, 2009

(51) Int. Cl.
G06F 15/00 (2006.01)
(52) U.S. Cl. .......................................... 715/240; 715/234
(58) Field of Classification Search .................. 715/200, 715/234, 240, 255, 272
See application file for complete search history.

(56) References Cited

U.S. PATENT DOCUMENTS

| | | | | |
|---|---|---|---|---|
| 5,581,670 | A * | 12/1996 | Bier et al. | 715/856 |
| 5,604,858 | A * | 2/1997 | Jefferson et al. | 715/788 |
| 5,617,114 | A * | 4/1997 | Bier et al. | 345/634 |
| 7,000,184 | B2 | 2/2006 | Matveyenko et al. | |
| 7,124,360 | B1 | 10/2006 | Drenttel et al. | |
| 7,259,753 | B2 | 8/2007 | Keely et al. | |
| 7,574,048 | B2 * | 8/2009 | Shilman et al. | 382/187 |
| 7,793,231 | B2 * | 9/2010 | Berstis et al. | 715/791 |
| 2001/0021935 | A1 | 9/2001 | Mills | |
| 2002/0078105 | A1* | 6/2002 | Hamada et al. | 707/530 |
| 2003/0229845 | A1* | 12/2003 | Salesin et al. | 715/500 |
| 2003/0233614 | A1 | 12/2003 | Mohamed | |
| 2004/0044966 | A1 | 3/2004 | Malone | |
| 2004/0205488 | A1 | 10/2004 | Fry | |
| 2004/0210822 | A1* | 10/2004 | Kotler et al. | 715/500 |
| 2004/0268235 | A1 | 12/2004 | Wason | |
| 2005/0034060 | A1* | 2/2005 | Kotler et al. | 715/503 |
| 2005/0044486 | A1* | 2/2005 | Kotler et al. | 715/503 |
| 2005/0044496 | A1* | 2/2005 | Kotler et al. | 715/538 |
| 2005/0044497 | A1* | 2/2005 | Kotler et al. | 715/538 |
| 2005/0050088 | A1* | 3/2005 | Kotler et al. | 707/102 |
| 2005/0055626 | A1* | 3/2005 | Kotler et al. | 715/503 |
| 2005/0066265 | A1* | 3/2005 | Kotler et al. | 715/503 |
| 2005/0125377 | A1* | 6/2005 | Kotler et al. | 707/1 |
| 2005/0134906 | A1* | 6/2005 | Takashima | 358/1.15 |
| 2005/0193321 | A1 | 9/2005 | Iwema et al. | |
| 2005/0262439 | A1* | 11/2005 | Cameron | 715/523 |
| 2006/0050969 | A1* | 3/2006 | Shilman et al. | 382/224 |
| 2006/0077494 | A1* | 4/2006 | Kanzaki et al. | 358/537 |
| 2006/0242145 | A1* | 10/2006 | Krishnamurthy et al. | 707/6 |
| 2007/0028166 | A1 | 2/2007 | Hundhausen et al. | |
| 2007/0150477 | A1* | 6/2007 | Barsness et al. | 707/10 |

(Continued)

OTHER PUBLICATIONS

Williams, "How to Create an HTML Editor for ASP.NET AJAX", Copyright Eric Williams, 2007, pp. 1-9.

(Continued)

Primary Examiner — Stephen Hong
Assistant Examiner — Gregory J Vaughn
(74) Attorney, Agent, or Firm — Hope Baldauff Hartman, LLC

(57) ABSTRACT

Technologies are described herein for editing a document using a transitory editing surface. A word processing program displays a document in a window. Upon detection of the placement of an insertion pointer within a paragraph of text in the document, an editing surface is created overlaying the paragraph in the window and containing the contents of the underlying paragraph. User input is monitored by the word processing program while the editing of the contents is processed by the editing surface. When editing is complete, the modified contents of the editing surface are copied into the document and the editing surface is destroyed.

17 Claims, 8 Drawing Sheets

U.S. PATENT DOCUMENTS

2007/0288859 A1 12/2007 Vuong et al.
2008/0209311 A1* 8/2008 Agronik et al. ............... 715/234

OTHER PUBLICATIONS

"Gecko:Reflow Refactoring", retrieved on Oct. 23, 2007 at <<http://wiki.mozilla.org/Gecko:Reflow_Refactoring>>, pp. 1-10.

"Rich Text Editor", retrieved on Oct. 23, 2007 at <<http://developer.yahoo.com/yui/editor/>>, pp. 1-7.

International Search Report dated Jun. 1, 2009 in International Application No. PCT/US2009/031482.

Chinese Official Action dated Feb. 16, 2012 in Chinese Application No. 200980106644.6.

* cited by examiner neque. Nam ultrices lectus sed diam. Praesent vulputate mi sed dui interdum porttitor. Aenean eget nisl tincidunt pede accumsan tincidunt. Aliquam erat volutpat. Fusce leo. Maecenas ut diam ut purus laoreet faucibus. Sed viverra nunc vitae nisi. Nullam nulla pede, auctor eu, dictum non, pharetra eu, orci.

Lorem ipsum dolor sit amet, consectetuer adipiscing elit. Proin pharetra ipsum non dolor. Aenean consequat nunc eu lectus. Sed posuere nisl a urna. Cum sociis natoque penatibus et magnis dis parturient montes, nascetur ridiculus mus. Cras tincidunt. Nullam ullamcorper, augue ac malesuada eleifend, urna magna vehicula tellus, ut tempor libero nibh id arcu. Etiam eu ligula nec elit venenatis fermentum. Nulla id urna sit amet magna eleifend suscipit. Aliquam vel odio. Donec erat. Integer vitae dolor consectetuer dolor facilisis varius. Aenean condimentum, erat in vulputate molestie, ligula arcu imperdiet dolor, a feugiat diam sapien eu metus.

| Lorem ipsum | Proin pharetra ipsum | Cras tincidunt |
|---|---|---|
| Lorem ipsum | Proin pharetra ipsum | Cras tincidunt |
| Lorem ipsum | Proin pharetra ipsum | Cras tincidunt |
| Lorem ipsum | Proin pharetra ipsum | Cras tincidunt |

EDITING A DOCUMENT USING A TRANSITORY EDITING SURFACE

BACKGROUND

Word processing applications have traditionally been stand-alone software programs installed on a personal computer that provide rich editing and formatting functionality for documents stored in local or network-based files. These applications are generally very large, requiring many megabytes of drive space to install. The recent trend, however, is for collaborative development of documents by remotely diverse users who may not have access to the same stand-alone word processing applications and where the documents may be stored on remote networks accessible over the Internet. This has led to the development of word processing programs that can be delivered via a conventional World Wide Web ("web") browser, thereby allowing remote documents to be edited by users without the need to install a traditional stand-alone word processor.

One method of providing web-based word processing functionality involves developing web pages that utilize the editing features available in many web browser programs. This method has the advantage of being small and fast and requires very little development effort. However, the limited editing features provided by these web browsers generally cannot compare with the feature rich capabilities of traditional stand-alone word processors. Moreover, the editing features available may vary among the different web browser programs, thereby making it difficult to provide a consistent user experience across all web browsers.

Another method of providing web-based word processing functionality is to implement a complete word processing program that is executed within a browser using a cross-browser runtime technology such as JAVA from SUN MICROSYSTEMS, FLASH from ADOBE SYSTEMS, or Asynchronous JavaScript and XML ("AJAX"). While allowing the developer complete control over the features and capabilities of the program, this method generally involves a considerable development effort and requires implementation of low level editing functionality, such as the rendering of text in a window as typed by the user, the movement of a blinking cursor through the text, or the constant reflow of the contents of the window the user types. In addition, because the word processing program is executed in a browser-based runtime technology, it is often slow in execution and may not be able to provide an adequately responsive user interface.

It is with respect to these considerations and others that the disclosure made herein is presented.

SUMMARY

Technologies are described herein for implementing a hybrid editing model word processor program for execution in a web browser. In particular, the word processing program is implemented in a cross-browser runtime technology and provides a rich set of editing features comparable to that of traditional stand-alone word processors. However, the word processing program utilizes some of the editing features provided by the web browser to implement the low level editing functionality. In particular, the word processing program uses the web browser to provide an editing surface that accepts user changes to individual blocks of text or paragraphs. The editing surface is transitory in that it is active only as long as necessary to provide the low level text editing features to the user.

According to one aspect presented herein, a document within a web browser may be edited using a transitory editing surface. In this regard, a word processing program executing in the web browser displays the document in a browser window. The word processing program detects the placement of an insertion pointer within a paragraph of text in the document, such as by a user clicking with a mouse within the text or by using the navigation keys of a keyboard to navigate to the paragraph. When the placement of the insertion pointer is detected, the word processing program creates an editing surface overlaying the paragraph in the document. This may be accomplished by adding an editing surface element to the document positioned at the same location and of the same size as the underlying paragraph, while making the underlying paragraph invisible. In one aspect, the editing surface element may be a Hypertext Markup Language ("HTML") IFRAME element. The contents of the underlying paragraph are copied into the editing surface.

The word processing program then monitors for user input in the browser window, allowing certain input to be handled directly by the editing surface, while intercepting other input for handling by the word processing program. According to one aspect, the word processing program passes letter, number, and punctuation key input from the keyboard directly to the editing surface while intercepting mouse clicks or navigation keys, such as page-down or page-up. The editing surface processes the user input, thereby allowing the user to make changes to the contents contained within.

The word processing program monitors the editing surface as it processes the user input to determine if a reflow of the editing surface is required. For example, changes to the content within the editing surface may necessitate a change to the size or position of the editing surface in the browser window. If a reflow is required, the modified contents of the editing surface are copied back into the document, and the web browser is forced to re-render the document on the page. The new position and size of the underlying paragraph is then determined and the editing surface is repositioned and resized to match the new position and size of the underlying paragraph. When editing is complete, the modified contents of the editing surface are copied back into the document, the editing surface is destroyed, and the underlying paragraph is made visible again.

It should be appreciated that the above-described subject matter may also be implemented as a computer-controlled apparatus, a computer process, a computing system, or as an article of manufacture such as a computer-readable medium. These and various other features will be apparent from a reading of the following Detailed Description and a review of the associated drawings.

This Summary is provided to introduce a selection of concepts in a simplified form that are further described below in the Detailed Description. This Summary is not intended to identify key features or essential features of the claimed subject matter, nor is it intended that this Summary be used to limit the scope of the claimed subject matter. Furthermore, the claimed subject matter is not limited to implementations that solve any or all disadvantages noted in any part of this disclosure.

BRIEF DESCRIPTION OF THE DRAWINGS

FIGS. 2A-2C are screen diagrams showing an illustrative screen shot of the operation of the transitory editing surface according to one embodiment described herein;

DETAILED DESCRIPTION

Figure 1:
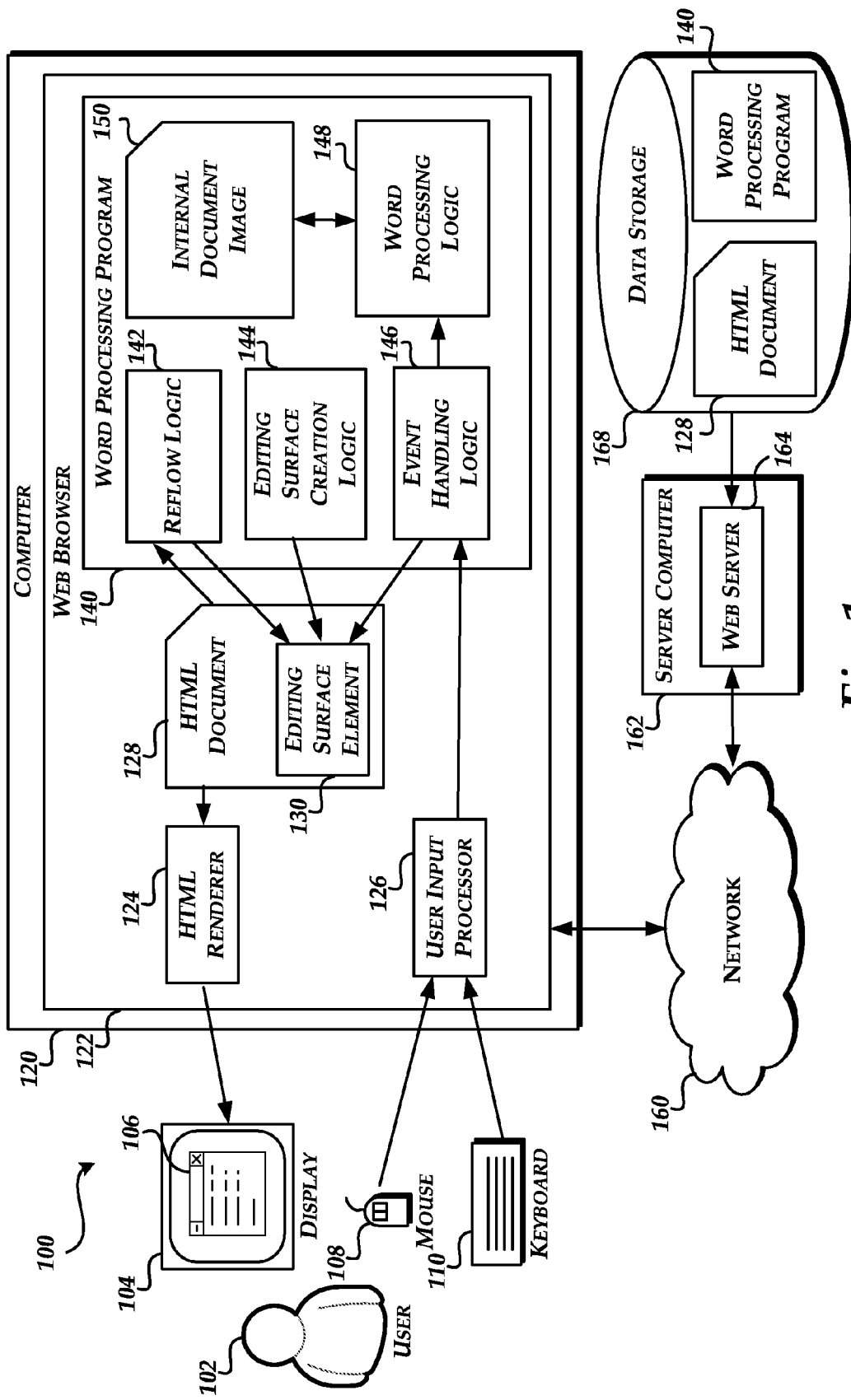
FIG. 1 is a network and software architecture diagram showing aspects of an illustrative operating environment and several software components provided by the embodiments presented herein.

The following detailed description is directed to technologies for providing word processing functionality within a browser. Through the use of the technologies and concepts presented herein, a word processing program may be implemented within a browser that provides a feature rich word processing experience similar to that of traditional stand-alone word processing programs without requiring the program to implement the low level details of managing the editing of text. This is accomplished by implementing a hybrid between a complete, custom-developed word processing program and the content editing features of the web browser. The word processing program provides the high level word processing functionality, while the editing features of the web browser are employed to perform the low level text editing functions, such as the rendering of text in a window as typed by the user, the movement of a blinking cursor through the text, or the constant reflow of the contents of the window as the user type. The editing features of the web browser are utilized to temporarily place an editing surface in the window in place of the contents of the document being edited. The editable surface is transitory in that it remains visible and active only as long as required. Once editing of the contents is complete, the editing surface is destroyed and the modified document is displayed to the user.

While the subject matter described herein is presented in the general context of program modules that execute in conjunction with the execution of an operating system and application programs on a computer system, those skilled in the art will recognize that other implementations may be performed in combination with other types of program modules. Generally, program modules include routines, programs, components, data structures, and other types of structures that perform particular tasks or implement particular abstract data types. Moreover, those skilled in the art will appreciate that the subject matter described herein may be practiced with other computer system configurations, including hand-held devices, multiprocessor systems, microprocessor-based or programmable consumer electronics, minicomputers, mainframe computers, and the like.

In the following detailed description, references are made to the accompanying drawings that form a part hereof, and which show by way of illustration specific embodiments or examples. Referring now to the drawings, in which like numerals represent like elements through the several figures, aspects of a computing system and methodology for editing a document using a transitory editing surface will be described.

Turning now to FIG. 1, details will be provided regarding an illustrative operating environment and several software components provided by the embodiments presented herein. In particular, FIG. 1 shows aspects of a system 100 for editing a document using a transitory editing surface. The system 100 includes a computer 120 comprising a standard desktop or laptop computer system capable of executing an operating system and one or more application programs. The computer 120 is operatively connected to a display 104, mouse 108, and keyboard 110 to allow a user 102 to interact with system and application programs executing on the computer 120. The computer 120 is interconnected to a server computer 162 through one or more local and wide area networks, such as the network 160. It should be appreciated that many more network connections may be utilized than illustrated in FIG. 1.

The computer 120 is operative to execute a web browser 122 that is operatively connected via the network 160 to a web server 164 executed by the server computer 162. In one embodiment, the web browser 122 is an application program capable of displaying HTML documents, such as INTERNET EXPLORER from MICROSOFT CORP., FIREFOX from MOZILLA, or SAFARI from APPLE, INC. It will be appreciated by one of ordinary skill in the art, however, that any type of application program capable of rendering a markup language and executing script logic may be utilized to embody the web browser 122. The web server 164 includes any software program capable of serving documents to a web browser 122. The web server 162 is further connected to a data storage 168 containing documents and a word processing program 140, which will be described in more detail below. According to one embodiment, the documents may include an HTML document 128 to be served to the web browser 122. Upon request by a user 102 of the computer 120, the web browser 122 is operative to retrieve the HTML document 128 from the web server 164 and render it in a window 106 on the display 104 for presentation to the user 102.

As discussed briefly above, the system 100 also includes a word processing program 140 operative to allow the user 102 of the computer 120 to edit the contents of the HTML document 128 in the window 106. According to one embodiment, the word processing program 140 is capable of executing within a runtime environment provided by the web browser 122. For example, the word processing program 140 may be created using AJAX development techniques.

In one embodiment, the word processing program 140 is retrieved from the web server 164 along with the document 128 to be edited. In alternative embodiments, the word processing program 140 may reside locally on the computer 120. The word processing program 140 includes word processing logic 148 which is operative to provide word processing functionality to the user 102. In one embodiment, the word processing program 140 maintains the contents of the document being edited in an internal document image 150. In other embodiments, the word processing program 140 maintains the contents of the document being edited directly within the HTML document 128. The HTML renderer 124 renders the HTML document 128 for display.

In one embodiment, the word processing program 140 includes event handling logic 146, which monitors for user input events from user input processor 126. As will be described in detail below in regard to FIG. 3, the event handling logic 146 is operative to detect the placement by the user 102 of an insertion pointer at a location within the HTML document 128 as displayed in the window 106. The event handling logic 146 is further operative to monitor user input events during the editing of the document's contents, as described below in regard to FIG. 4.

The word processing program 140 also includes editing surface creation logic 144, which creates an editing surface in the window 106 to accept changes to the contents of the document, as is described in detail below in regard to FIG. 3. In one embodiment, the editing surface is created by adding markup to the HTML document 128 to create an editing surface element 130, which, when rendered by the web browser 122, displays the editing surface in the window 106. In addition, the word processing program 140 includes reflow logic 142. As will be described in detail below in regard to FIG. 5, the reflow logic 142 maintains the size and the position of the editing surface 208 as the user 102 changes the contents therein.

Figure 2B:
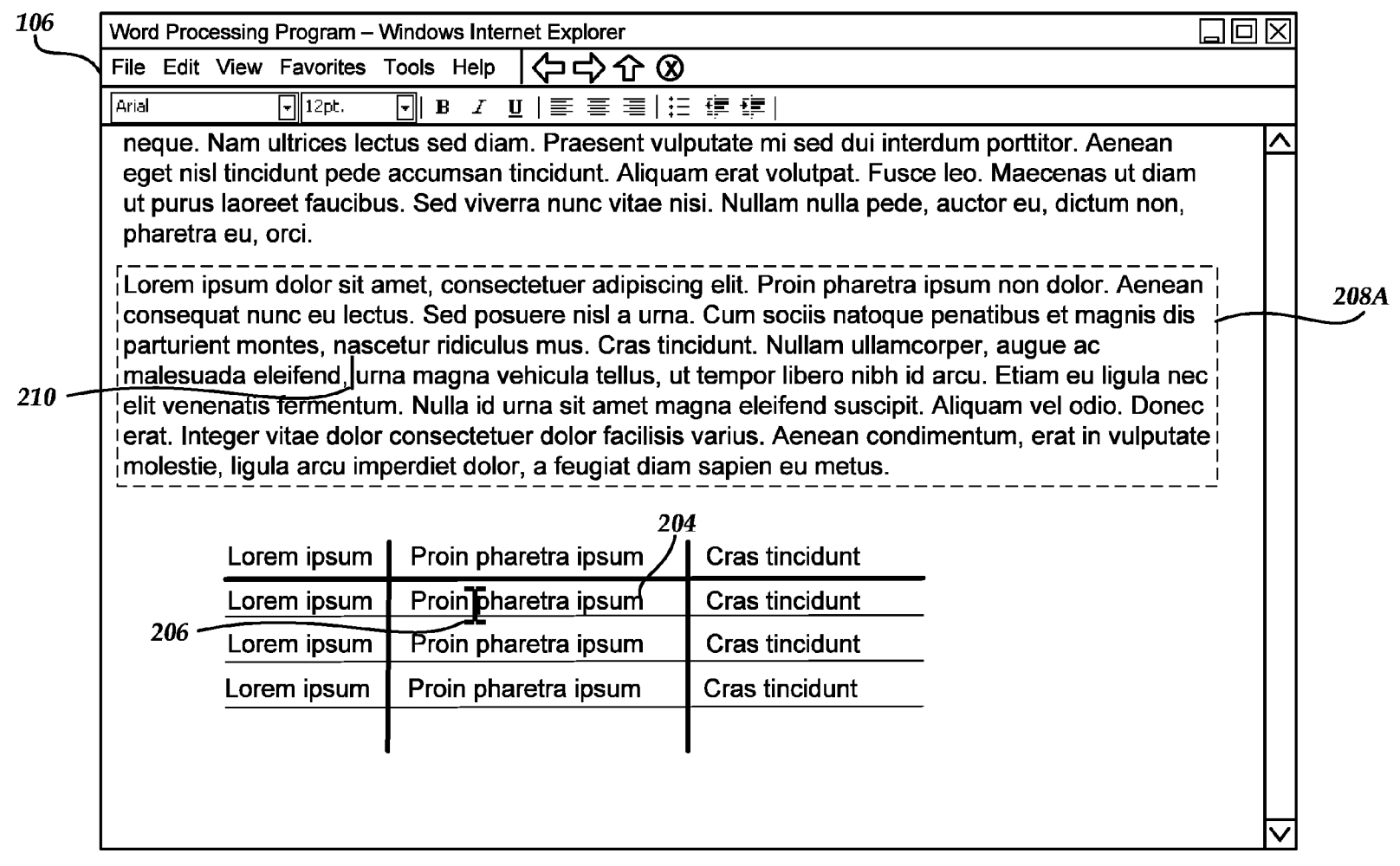
Figure 2C:
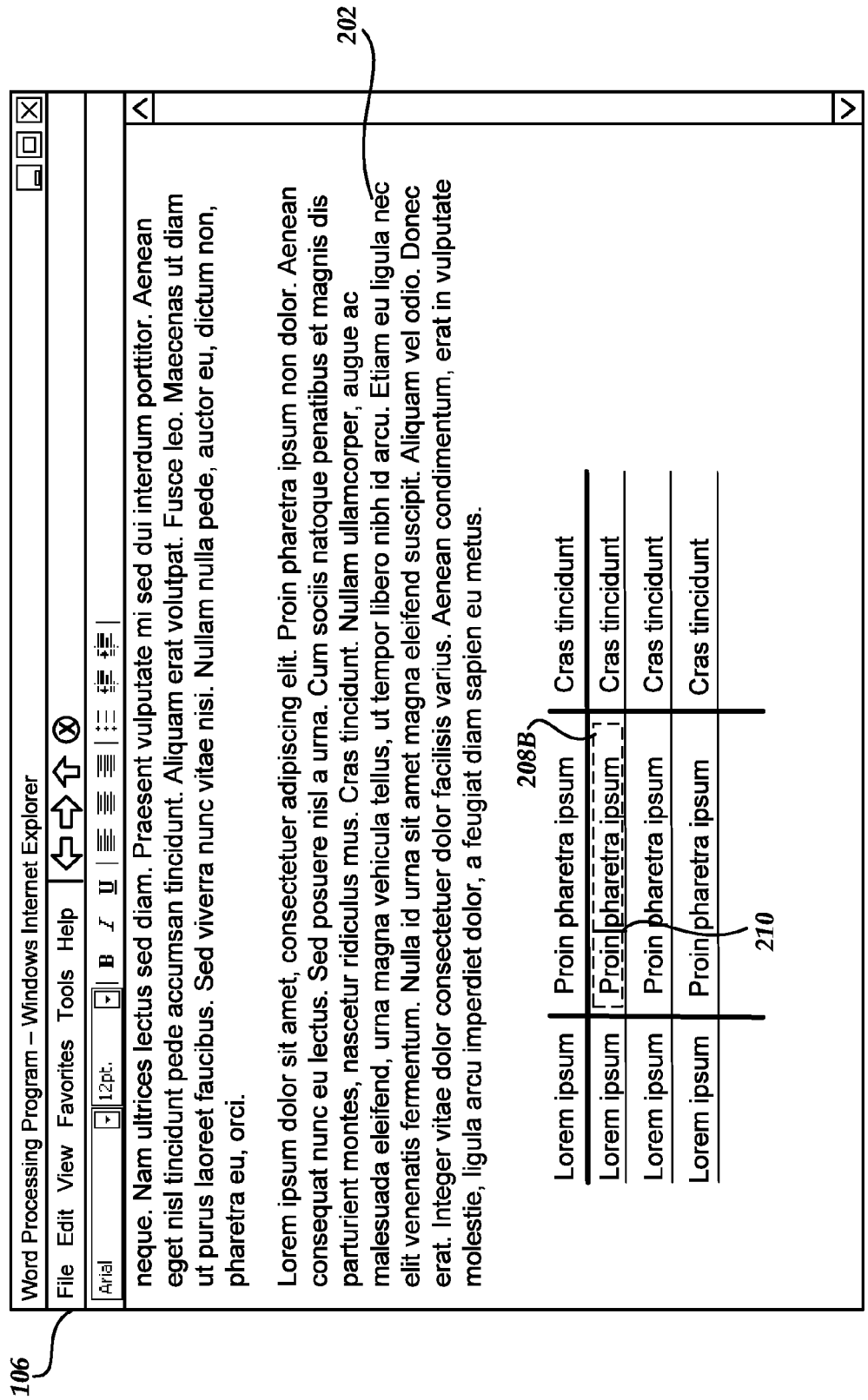

Referring now to FIGS. 2A-2C, illustrative screenshots of the window 106 generated by the word processing program 140 executing in the web browser 122 are shown, in accordance with one embodiment. As shown in FIG. 2A, the window 106 displays a paragraph of text 202 contained in the main body of the HTML document 128 as well as a block of text within a table 204 of the HTML document 128. The user 102, wishing to edit the paragraph of text 202, may use the mouse 108 to position the mouse pointer, illustrated here as a text insertion pointer or caret 206, at a position within the paragraph of text 202 in the window 106, and clicks a button on the mouse 108. The event handling logic 146 of the word processing program 140 detects the mouse click with the insertion pointer 206 within the paragraph 202 and causes the editing surface creation logic 144 to create an editing surface 208A overlaying the paragraph of text 202 in the window 106, as illustrated in FIG. 2B. It should be appreciated that user input activity described herein as being performed by a mouse may be submitted using another type of input device.

As will be described in detail below in regard to FIG. 3, the editing surface creation logic 144 creates the editing surface 208A such that it is the same size and in the same position as the paragraph or text 202 as it appears in the window 106. The editing surface creation logic 144 further copies the contents of the paragraph 202 into the editing surface 208A, and makes the paragraph 202 invisible in the window 106. Note that while the paragraph 202 is no longer visible in the window 106, it still occupies the same physical space within the window 106, and thus is essentially underlying the editing surface 208A. The editing surface creation logic 144 then positions a cursor 210 within the editing surface 208A corresponding to the position of the placement of the insertion pointer 206 within the paragraph 202 by the user 102. It should be noted that the boundaries of the editing surface 208A shown in the screenshot of FIG. 2B are for illustration purposes only. No actual boundaries for the editing surface 208A are created in the window 106. The process of creating the editing surface 208A, copying the contents of the underlying paragraph 202 into the editing surface 208A, and making the underlying paragraph invisible in the window as described in the various embodiments is imperceptible to the user 102. The only change to window 106 that the user 102 perceives is the creation of the cursor 210 at the position of the placement of the insertion pointer 206.

The editing surface 208A remains active in the window 106 to allow the user 102 to make low level edits to the text contents of the editing surface 208A. For example, in one embodiment the editing surface 208A allows the user 102 to add or delete characters from the text at the current position of the cursor 210. If the user 102 requests a higher level editing function from the word processing program 140, or navigates to a different portion of the HTML document 128 in the window 106, then the HTML document 128 is updated with the edits made by the user 102 in the editing surface 208A and the editing surface 208A is destroyed, as is described in detail below in regard to FIG. 4. For example, if the user 102 places an insertion pointer 206 in the block of text within the table 204 displayed in the window 106, then the editing surface 208A is destroyed, and the paragraph of text 202 underlying the editing surface 208A is updated with any edits from the editing surface 208 and made visible again in the window 106, as illustrated in FIG. 2C. As further illustrated, a new editing surface 208B is created overlaying the block of text within the table 204, and a cursor 210 for the insertion of text is created within the new editing surface 208B.

Figure 3:
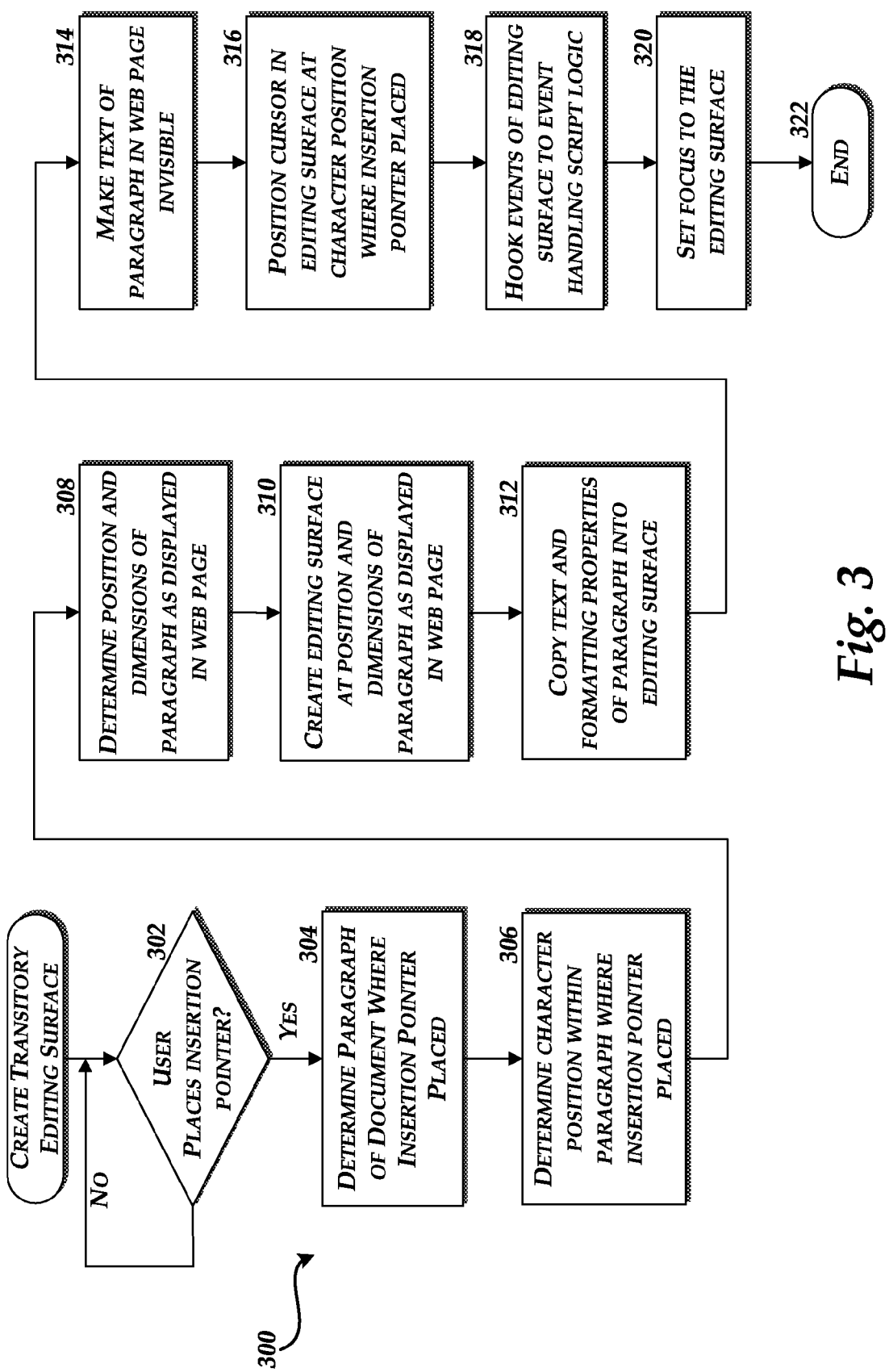
FIGS. 3-5 are flow diagrams showing aspects of the operation of a word processing program providing a transitory editing surface provided in the embodiments described herein.

Referring now to FIG. 3, additional details will be provided regarding the embodiments presented herein for editing a document using a transitory editing surface. In particular, FIG. 3 is a flow diagram illustrating aspects of the operation of creating the transitory editing surface 208 in the window 106. It should be appreciated that the logical operations described herein are implemented (1) as a sequence of computer implemented acts or program modules running on a computing system and/or (2) as interconnected machine logic circuits or circuit modules within the computing system. The implementation is a matter of choice dependent on the performance and other requirements of the computing system. Accordingly, the logical operations described herein are referred to variously as states operations, structural devices, acts, or modules. These operations, structural devices, acts and modules may be implemented in software, in firmware, in special purpose digital logic, and any combination thereof. It should also be appreciated that more or fewer operations may be performed than shown in the figures and described herein. These operations may also be performed in a different order than those described herein.

The routine 300 begins at operation 302, where the event handling logic 146 detects that the user 102 has placed an insertion pointer 206 at a location within the window 106. As discussed above, in one embodiment, the user 102 may place an insertion pointer 206 at a location in the window 106 using the mouse 108 or by moving the current cursor 210 from one section of the HTML document 128 to another using the navigation keys of the keyboard 110. In alternative embodiments, the user 102 may place an insertion pointer 206 by touching the display 104 with a finger or stylus at a location in the window 106.

Upon detection of the placement of an insertion pointer 206, the routine 300 moves to operation 304, where the editing surface creation logic 144 determines the portion of the HTML document 128 that is currently displayed at the location within the window 106 where the insertion pointer 206 was placed. In one embodiment, the HTML document 128 may be divided into paragraphs of text 202 contained within the main body of the document or within other containers, such as a cell of a table 204. When the user 102 places the insertion pointer 206 by using the mouse 108, the editing surface creation logic 144 requests the identity of the paragraph 202 within the HTML document 128 corresponding to the location where the mouse 108 was clicked from the web browser 122. If the user 102 places the insertion pointer 206 by using the navigation keys of the keyboard 110, the editing surface creation logic 144 determines the correct paragraph by analyzing the contents of the HTML document 128. In alternative embodiments, other divisions of the document may be desired.

From operation 304, the routine 300 continues to operation 306, where the editing surface creation logic 144 determines a character position within the paragraph 202 that most closely corresponds to the location within the window 106 where the insertion pointer 206 was placed. This character position will be used to position a cursor 210 in the editing surface 208 at a position corresponding to where the insertion pointer 206 was placed within the paragraph. In one embodiment, the editing surface creation logic 144 uses a binary search algorithm to determine the character position. For example, an HTML element, such as a SPAN element, is placed in the HTML document 128 at a character position in the middle of the markup containing the text of the paragraph. The coordinates within the window 106 of the location of the SPAN element are requested from the web browser 122 and compared to the coordinates of the placement of the insertion pointer 206 to determine whether the insertion pointer 206 was positioned before or after the SPAN element in the text. The process is repeated again, placing the SPAN element in the middle of the first half or second half of the markup, respectively, and continues in an iterative fashion until the character position within the paragraph 202 corresponding to the location of the insertion pointer 206 is determined.

From operation 306, the routine 300 continues to operation 308, where the editing surface creation logic 144 determines the current position and dimensions of the paragraph 202 as displayed in the window 106. In one embodiment, this information is requested from the web browser 122 once the paragraph 202 is identified. The editing surface creation logic 144 then creates an editing surface 208 in the window 106 at the same location and of the same dimensions as the paragraph 202, as indicated at operation 310. In one embodiment, the editing surface creation logic 144 creates the editing surface 208 by adding markup to the HTML document 128 to create an editing surface element 130, such as an HTML IFRAME element. The editing surface element 130 is made editable by setting its contentEditable attribute to "true". In alternative embodiments, the editing surface element 130 may be an HTML DIV element with its contentEditable attribute set to "true" or an HTML TEXTAREA element. The editing surface creation logic 144 sets the size and position attributes of the editing surface element 130 so that it is rendered by the web browser 122 in the same position and of the same size in the window 106 as the paragraph 202. As may be appreciated by one skilled in the art, if the insertion pointer 206 is placed in a new or empty paragraph such that the current size of the paragraph is zero, the editing surface creation logic 144 creates the editing surface 208 of sufficient height and width to properly display the cursor 210 and the first few characters typed by the user 102.

From operation 310, the routine 300 moves to operation 312, where the editing surface creation logic 144 copies the contents of the paragraph 202 in the HTML document 128 to the editing surface 208. This includes copying the text contained within the paragraph 202 in the HTML document 128 into the editing surface element 130 as well as setting the attributes of the editing surface element 130 to be the same as those applied to the paragraph 202 in the HTML document 128. The editing surface creation logic 144 then makes the paragraph 202 invisible in the window 106 at operation 314. As discussed above, this is accomplished in such a way that the paragraph 202 is no longer visible to the user 102 in the window 106 but still occupies the same physical space within the window 106. For example, in one embodiment, the visibility attribute of the paragraph 202 in the HTML document 128 is set to "hidden".

The routine 300 then moves to operation 316, the editing surface creation logic 144 positions the cursor 210 in the editing surface 208 at the character position corresponding to the character position where the insertion pointer 206 was placed, calculated in operation 306. In one embodiment, this is accomplished by setting the current selection to an empty range of text at the character position. Next, the routine 300 proceeds to operation 318, where the editing surface creation logic 144 registers event handlers of the event handling logic 146 for the editing surface 208. As will be described in more detail below in regard to FIG. 4, this allows the event handling logic 146 to process mouse, keyboard, and other browser events, such as scrolling, from the editing surface 208. At operation 320, the current focus in the window 106 is set to the editing surface 208.

Figure 4:
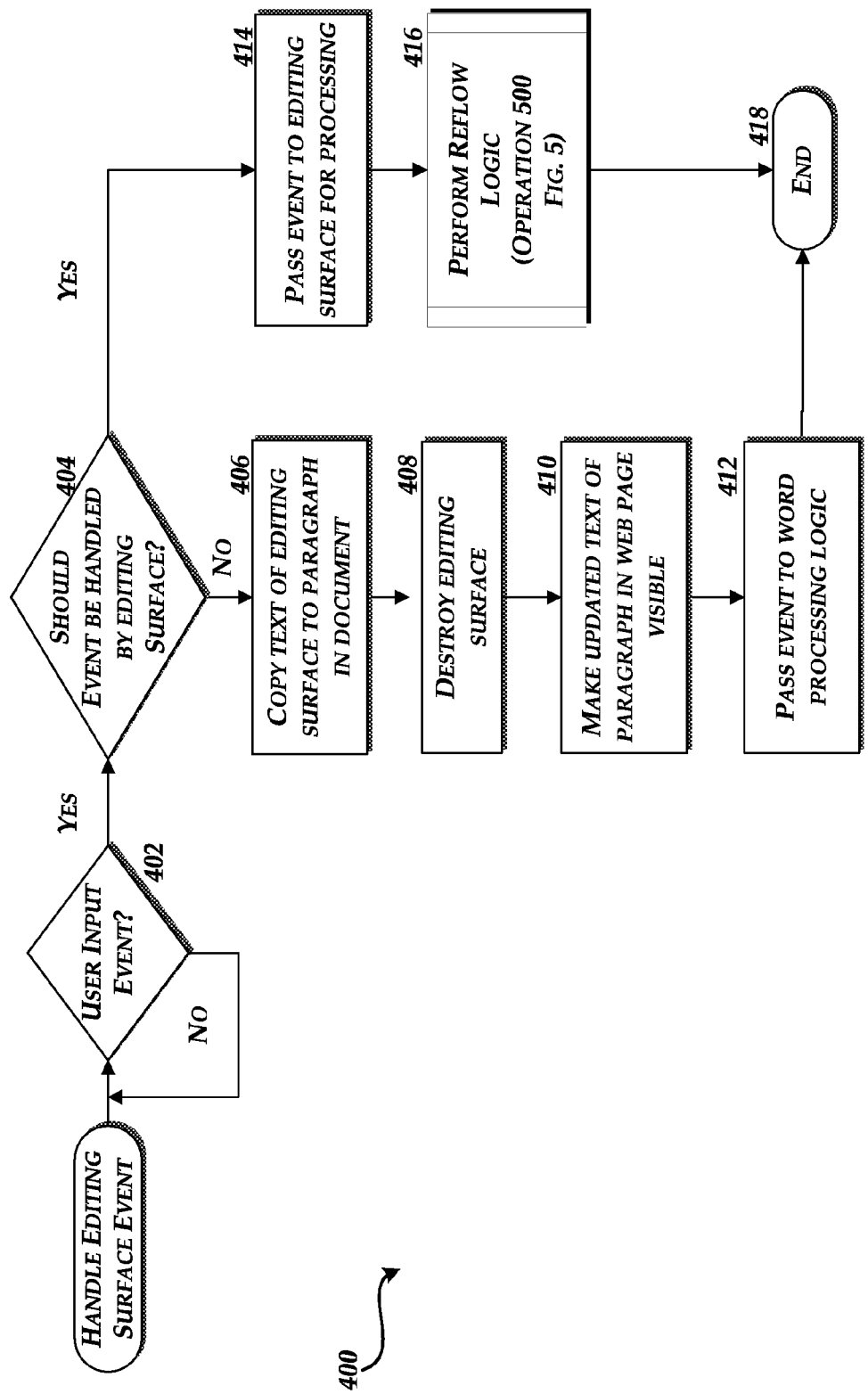

FIG. 4 is a flow diagram illustrating aspects of the operation of handling events generated by the editing surface 208 or the web browser 122 while the editing surface 208 is active in the window 106. The routine 400 begins at operation 402, where the event handling logic 146 detects that the editing surface 208 has generated an event, primarily as the result of user input such as by clicking the mouse 108 or typing on the keyboard 110. Upon detection of the user input event, the event handling logic 146 determines whether the editing surface element 130 will process the user input natively at operation 404.

In one embodiment, if the user input represents a character typed at the keyboard 110, the event handling logic 146 compares the character typed to a list of characters that are to be processed by the editing surface element 130. For example, if the character typed is a letter, number or punctuation character, then the event handling logic 146 determines that it will be processed by the editing surface element 130. However, if the character typed may result in a format change to the text, such as CTRL-B, it will not be forwarded to the editing surface element 130 for processing. In alternative embodiments, the event handling logic 146 may allow the editing surface element 130 to process additional keyboard input, such as the cursor navigation keys or copy and paste shortcut keys.

If the event handling logic 146 determines that the editing surface element 130 will process the user input natively, the routine 400 proceeds to operation 414, where the user input is passed to the editing surface element 130 for processing. After the editing surface element 130 processes the user input, the routine 400 proceeds to operation 416, where the reflow logic 142 is performed. This will be described in detail below in regard to FIG. 5. In one embodiment, the event handling logic 146 sets a timer in the web browser 122 with a timeout value of zero before passing the user input to the editing surface element 130. In this way, a corresponding timer event will be generated immediately after the user input is processed by the editing surface element 130, allowing the event handling logic 146 to perform the reflow operation.

If the event handling logic 146 determines that the editing surface element 130 will not process the user input natively, the routine 400 moves to operation 406 where the event handling logic 146 copies the text from the editing surface 208, including any changes made by the user 102, back to the underlying paragraph 202 of the HTML document 128. The event handling logic 146 then destroy the editing surface 208, as provided in operation 408, by removing the editing surface element 130 from the HTML document 128. At operation 410, the underlying paragraph 202 is made visible, reversing the change made in operation 314. This is accomplished, in one embodiment, by setting the visibility attribute of the paragraph 202 to "visible." The event handling logic 146 then passes the user input to the word processing logic 148 for further processing at operation 412.

Figure 5:
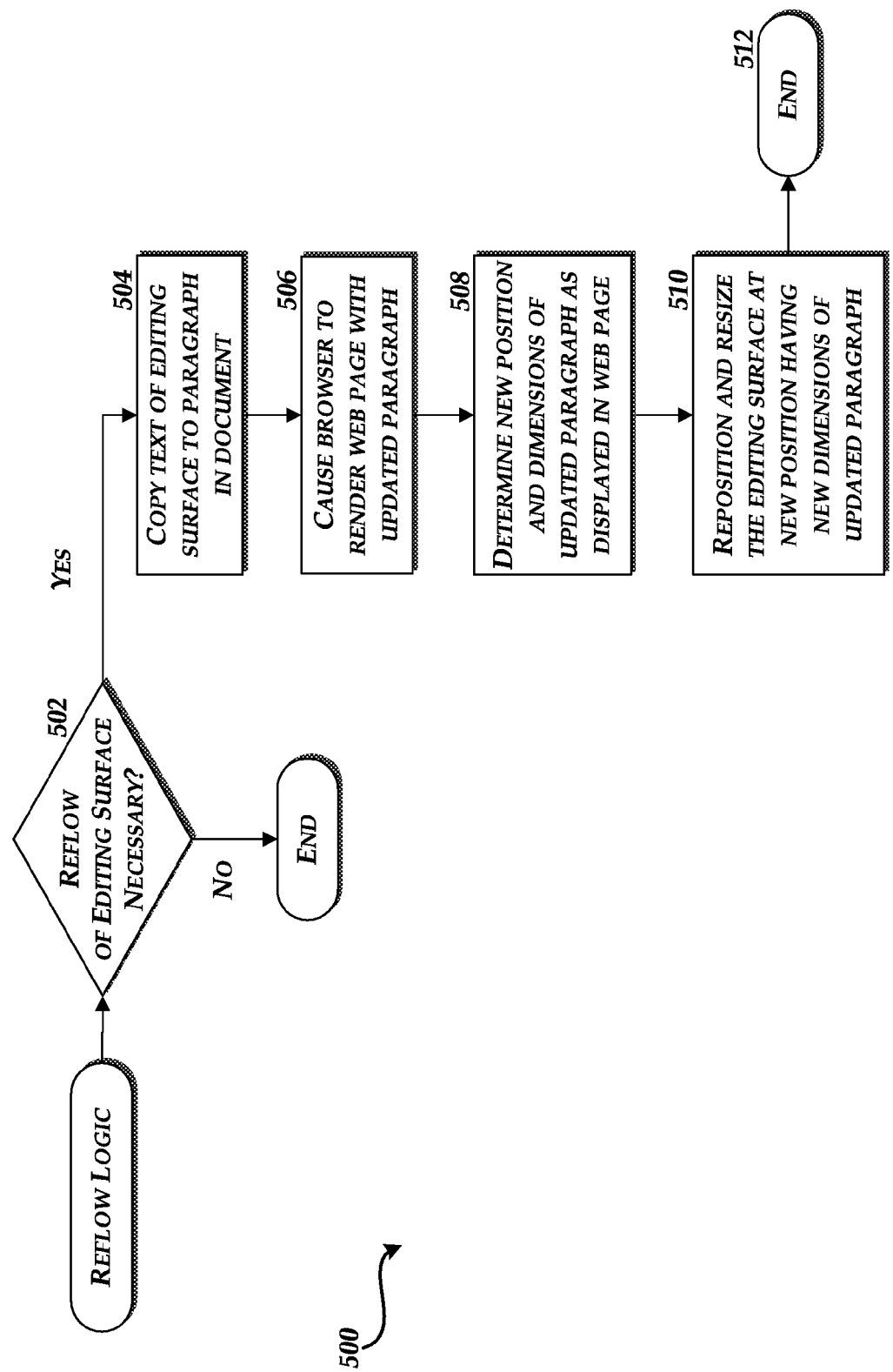

FIG. 5 is a flow diagram illustrating aspects of the operation of performing a reflow of the editing surface 208 within the HTML document 128 while it is active in the window 106. In various embodiments described herein, the HTML markup added to the HTML document 128 to create the editing surface element 130 may not result in an editing surface 208 that will properly grow or shrink in size in the window 106 while the user 102 edits the contents contained therein. For example, the HTML IFRAME element will not properly resize itself during editing of its contents. This can result in the contents of the editing surface 208 overflowing its boundaries, causing the editing surface 208 to scroll its contents up or down within its boundaries as displayed in the window 106. To prevent this from occurring, the reflow logic 142 dynamically maintains the size and position of the editing surface 208 in the window 106 as the user 102 edits the contents. In addition, the reflow logic 142 ensures that the size and position of the underlying, invisible paragraph 202 remains the same size of the active editing surface 208, to ensure the remainder of the HTML document 128 flows properly around the editing surface 208. This process is referred to herein as "reflow".

The routine 500 begins at operation 502, where the reflow logic 142 determines whether a reflow of the editing surface 208 is necessary. In one embodiment, the reflow logic 142 may perform the reflow operation after each user input event that is processed natively by the editing surface element 130. For example, the editing surface 208 may be reflowed after each character typed on the keyboard 110 by the user 102. In another embodiment, the reflow logic 142 may monitor web browser events through the event handling logic 146 to determine if a reflow operation is necessary. For example, the reflow logic 142 may perform the reflow operation of the editing surface 208 only in response to scroll events generated by the editing surface 208, indicating that an overflow condition has occurred. In yet other embodiments, the reflow logic 142 may perform text-metric calculations on the contents of the editing surface 208 to determine the likelihood that an overflow condition has occurred, and if it there is a high probability that an overflow occurred, the reflow operation will be performed.

Upon determining that a reflow of the editing surface 208 is necessary, the routine 500 proceeds to operation 504, where the reflow logic 142 copies the text from the editing surface 208, including any changes made by the user 102, back to the underlying paragraph 202 of the HTML document 128. At operation 506, the reflow logic 142 causes the web browser 122 to re-render the HTML document 128 in the window 106, thus triggering the web browser 122 to recalculate the position and size of the underlying paragraph 202, now containing the modified contents of the editing surface 208, as is it is displayed in the window 106. The reflow logic 142 then determines the new position and dimensions of the underlying paragraph 202 as displayed in the window 106, as depicted in operation 508. In one embodiment, this information is simply requested from the web browser 122. Once the new position and dimensions are known, the routine 500 proceeds to operation 510, where the reflow logic 142 repositions and resizes the editing surface 208 in the window 106 to match that of the underlying paragraph 202.

Figure 6:
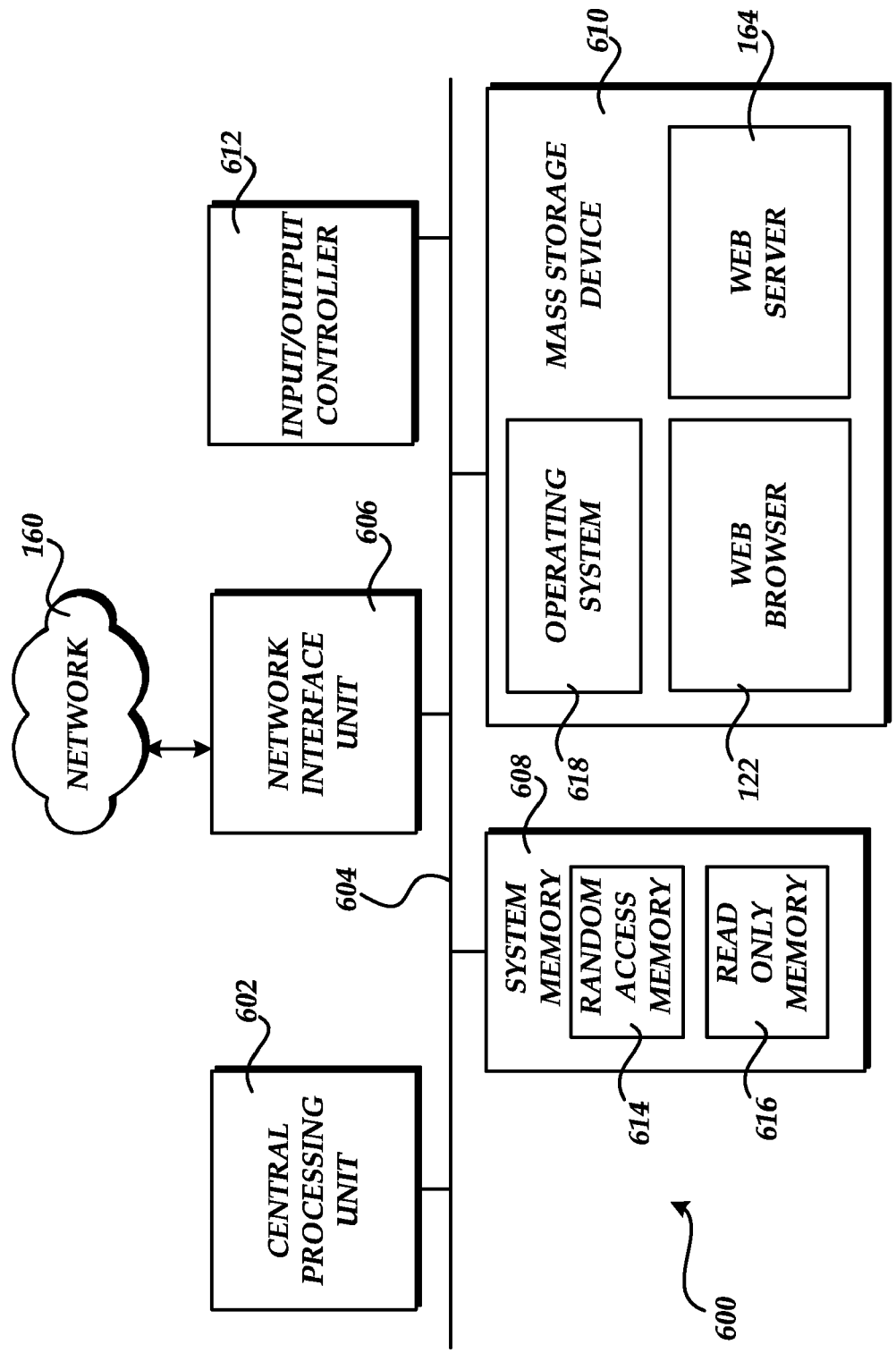
FIG. 6 is a computer architecture diagram showing an illustrative computer hardware and software architecture for a computing system capable of implementing aspects of the embodiments presented herein.

FIG. 6 shows an illustrative computer architecture for a computer 600 capable of executing the software components described herein for editing document using a transitory editing surface in the manner presented above. The computer architecture shown in FIG. 6 illustrates a conventional desktop, laptop, or server computer and may be utilized to execute any aspects of the software components presented herein described as executing on the computer 120 or server computer 162.

The computer architecture shown in FIG. 6 includes a central processing unit 602 ("CPU"), a system memory 608, including a random access memory 614 ("RAM") and a read-only memory ("ROM") 616, and a system bus 604 that couples the memory to the CPU 602. A basic input/output system containing the basic routines that help to transfer information between elements within the computer 600, such as during startup, is stored in the ROM 616. The computer 600 also includes a mass storage device 610 for storing an operating system 618, application programs, and other program modules, which are described in greater detail herein.

The mass storage device 610 is connected to the CPU 602 through a mass storage controller (not shown) connected to the bus 604. The mass storage device 610 and its associated computer-readable media provide non-volatile storage for the computer 600. Although the description of computer-readable media contained herein refers to a mass storage device, such as a hard disk or CD-ROM drive, it should be appreciated by those skilled in the art that computer-readable media can be any available computer storage media that can be accessed by the computer 600.

By way of example, and not limitation, computer-readable media may include volatile and non-volatile, removable and non-removable media implemented in any method or technology for storage of information such as computer-readable instructions, data structures, program modules or other data. For example, computer-readable media includes, but is not limited to, RAM, ROM, EPROM, EEPROM, flash memory or other solid state memory technology, CD-ROM, digital versatile disks ("DVD"), HD-DVD, BLU-RAY, or other optical storage, magnetic cassettes, magnetic tape, magnetic disk storage or other magnetic storage devices, or any other medium which can be used to store the desired information and which can be accessed by the computer 600.

According to various embodiments, the computer 600 may operate in a networked environment using logical connections to remote computers through a network such as the network 620. The computer 600 may connect to the network 620 through a network interface unit 606 connected to the bus 604. It should be appreciated that the network interface unit 606 may also be utilized to connect to other types of networks and remote computer systems. The computer 600 may also include an input/output controller 612 for receiving and processing input from a number of other devices, including a keyboard, mouse, or electronic stylus (not shown in FIG. 6). Similarly, an input/output controller may provide output to a display screen, a printer, or other type of output device (also not shown in FIG. 6).

As mentioned briefly above, a number of program modules and data files may be stored in the mass storage device 610 and RAM 614 of the computer 600, including an operating system 618 suitable for controlling the operation of a networked desktop, laptop, or server computer. The mass storage device 610 and RAM 614 may also store one or more program modules. In particular, the mass storage device 610 and the RAM 614 may store the web browser 122 or web server 164 application programs, each of which was described in detail above with respect to FIGS. 1-5. The mass storage device 610 and the RAM 614 may also store other types of program modules.

Based on the foregoing, it should be appreciated that technologies for editing a document using a transitory editing surface are provided herein. Although the subject matter presented herein has been described in language specific to computer structural features, methodological acts, and computer readable media, it is to be understood that the invention defined in the appended claims is not necessarily limited to the specific features, acts, or media described herein. Rather, the specific features, acts and mediums are disclosed as example forms of implementing the claims.

The subject matter described above is provided by way of illustration only and should not be construed as limiting. Various modifications and changes may be made to the subject matter described herein without following the example embodiments and applications illustrated and described, and without departing from the true spirit and scope of the present invention, which is set forth in the following claims.

What is claimed is:

1. A method for editing a text portion of a contents of a Hypertext Markup Language ("HTML") document in a window of a web browser, the method comprising:
presenting the HTML document in the window of the web browser;
receiving a request to edit the text portion of the contents of the HTML document;
in response to the request, determining a position and a size of the text portion of the contents of the HTML document as displayed in the window;
creating an editing surface overlaying the text portion of the contents of the HTML document as displayed in the window, the editing surface created by adding an HTML element to the HTML document having size and position attributes that cause the editing surface, when rendered by the web browser, to be displayed in the window at the position and of the size of the text portion of the contents of the HTML document;
copying the text portion of the contents of the HTML document to the editing surface;
receiving input within the window;
upon receiving the input, determining whether the editing surface will process the input;
upon determining that the editing surface will process the input, passing the input to the editing surface for processing and performing a reflow operation on the editing surface;
upon determining that editing surface will not process the input, applying any changes to the contents of the HTML document, removing the editing surface from the HTML document, and making the text portion of the contents of the HTML document as displayed in the window visible;
receiving a request to stop editing the text portion of the contents of the HTML document; and
in response to receiving the request, applying the one or more changes to the contents of the HTML document and destroying the editing surface.

2. The method of claim 1, wherein receiving a request to edit the text portion of the contents of the HTML document comprises:
detecting a placement of an insertion pointer at a position in the window and
determining the text portion of the contents of the HTML document displayed within the window at the position of the insertion pointer.

3. The method of claim 2, further comprising:
upon determining the text portion of the contents of the HTML document displayed within the window, determining a character position within the text portion of the contents of the HTML document corresponding to the position of the insertion pointer; and
upon creating the editing surface overlaying the text portion of the contents of the HTML document as displayed in the window, positioning a cursor at the character position in the text of the text portion of the contents of the HTML document within the editing surface.

4. The method of claim 1, wherein placing the editing surface overlaying the text portion of the contents of the HTML document as displayed in the window further comprises:
making the text portion of the contents of the HTML document as displayed in the window invisible.

5. The method of claim 1, wherein the HTML element added to the HTML document comprises one of an HTML IFRAME element, an HTML DIV element, or an HTML TEXTAREA element.

6. The method of claim 1, wherein performing a reflow operation on the editing surface comprises:
determining whether it is necessary to reflow the editing surface in the window; and
upon determining that it is necessary to reflow the editing surface,
applying the one or more changes to the contents of the HTML document,
causing the web browser to re-render the HTML document in the window,
determining a new position and a new size of the text portion of the contents of the HTML document as displayed in the window, and
modifying the size and position attributes of the HTML element added to the HTML document such that the editing surface is rendered by the web browser in the window at the new position and of the new size of the text portion of the contents of the HTML document.

7. The method of claim 1, wherein determining whether the editing surface will process the input comprises determining whether the input was a result of one of a letter key, a punctuation key, and a number key being pressed on a keyboard.

8. A computer storage medium having computer executable instructions stored thereon which, when executed by a computer, cause the computer to:
display a markup language document in a window generated by a web browser;
detect a placement of an insertion pointer at a position in the window;
upon detecting the placement of an insertion pointer, determine a text portion of the document displayed in the window at the position of the insertion pointer;
create an editing surface overlaying the text portion of the document in the window and copy the text portion of the document to the editing surface, the editing surface created by adding a markup language element to the document having size and position attributes that cause the editing surface, when rendered by the web browser, to be displayed in the window at the position and of the size of the text portion of the document;
detect input in the window;
upon detecting input in the window, determine whether the editing surface will process the input;
upon determining that the editing surface will process the input, pass the input to the editing surface to allow the editing surface to accept changes to the text portion of the document and perform a reflow operation of the editing surface; and
upon determining that the editing surface will not process the input, update the text portion of the document with the changes from the editing surface and destroy the editing surface.

9. The computer storage medium of claim 8, wherein creating an editing surface overlaying the text portion of the document in the window comprises:
determining a current position and a current size of the portion of the document as displayed in the window;
determining a character position within the text portion of the document corresponding to the position of the insertion pointer;
causing the text portion of the document to be rendered by the web browser as invisible in the window;

copying the text portion of the document into the editing surface; and positioning a cursor at the character position in the text portion of the document within the editing surface.

10. The computer storage medium of claim 9, wherein the markup language rendered by the web browser is Hypertext Markup Language (HTML) and the markup language element added to the document to cause the web browser to render an editing surface comprises one of an HTML IFRAME element, an HTML DIV element, or an HTML TEXTAREA element.

11. The computer storage medium of claim 8, wherein performing a reflow operation of the editing surface comprises:

determining if a reflow of the editing surface in the window is required; and upon determining that a reflow is required,
updating the text portion of the document in the window with the changes from the editing surface,
causing the web browser to re-render the document in the window, and
repositioning the editing surface to overlay the text portion of the document in the window.

12. The computer storage medium of claim 8, wherein determining whether the editing surface will process the input comprises determining whether the input was the result of one of a letter key, a punctuation key, and a number key being pressed on a keyboard.

13. A method for providing a transitory editing surface in a word processing program executing within a web browser, the method comprising:

detecting a placement of an insertion pointer by a user within a paragraph of text of a document being edited in the word processing program;

upon detecting the placement of the insertion pointer, determining a character position of the placement of the insertion pointer within the text;

determining a current position and size of the paragraph as displayed within a page in a window generated by the web browser;

creating an editing surface on the page at the position and of the size of the paragraph as displayed within the page, the editing surface created by adding a Hypertext Markup Language (HTML) element to the page to be rendered by the web browser;

copying the text to the editing surface;

making the paragraph as displayed within the page invisible;

positioning a cursor in the editing surface at the character position of the insertion pointer;

detecting user input within the window;

upon detecting the user input, determining whether the editing surface will process the user input;

upon determining that the editing surface will process the user input,
passing the user input to the editing surface for processing,
determining whether it is necessary to reflow the editing surface, and
upon determining that it is necessary to reflow the editing surface, performing a reflow operation of the editing surface; and upon determining that the editing surface will not process the user input,
updating the paragraph in the page with the text from the editing surface,
making the paragraph as displayed within the page visible,
destroying the editing surface, and
passing the user input to the word processing program for processing.

14. The method of claim 13, wherein performing a reflow operation of the editing surface comprises:

updating the paragraph in the page with the text from the editing surface;

causing the web browser to render the page in the window;

determining a new position and a new size of the paragraph as displayed within the page; and modifying the position and the size of the editing surface in the page to be the new position and the new size of the paragraph as displayed within the page.

15. The method of claim 13, wherein detecting user input within the window comprises intercepting keyboard and mouse events from the web browser.

16. The method of claim 13, wherein determining whether the editing surface will process the user input comprises determining whether the user pressed one of a letter key, a punctuation key, or a number key of a keyboard.

17. The method of claim 13, wherein determining whether it is necessary to reflow the editing surface comprises determining whether the processing of the user input by the editing surface caused the text within the editing surface as rendered by the web browser on the page to exceed the size of the editing surface.

* * * * *